United States Patent [19]

Potter et al.

[11] Patent Number: 5,503,533

[45] Date of Patent: Apr. 2, 1996

[54] FLUID LEVEL CONTROL PANEL STRUCTURE FOR MULTI-PUMP SYSTEM

[75] Inventors: Richard Potter, Winfield, Ill.; Jeffrey A. Reichard, Menomonee Falls, Wis.

[73] Assignee: Metropolitan Pump Company, Romeoville, Ill.

[21] Appl. No.: 249,523

[22] Filed: May 26, 1994

[51] Int. Cl.$^6$ ..................................................... I04B 49/10
[52] U.S. Cl. ........................... 417/63; 417/5; 137/567; 40/452
[58] Field of Search ..................... 137/567, 395, 137/397; 417/5, 7, 8, 36, 38, 40, 41, 63; 73/293; 362/23; 40/452

[56] References Cited

U.S. PATENT DOCUMENTS

| | | | |
|---|---|---|---|
| 3,624,648 | 11/1971 | Willooughby | 340/381 |
| 3,947,692 | 3/1976 | Payne | 250/577 |
| 4,127,030 | 11/1978 | Martig, Jr. | 73/194 R |
| 4,297,081 | 10/1981 | Irvin | 417/8 |
| 4,353,118 | 10/1982 | Heimgartner et al. | 364/510 |
| 4,380,933 | 4/1983 | Irvin | 73/749 |
| 4,444,545 | 4/1984 | Sanders et al. | 417/8 |
| 4,551,068 | 11/1985 | Boudreaux | 417/8 |
| 4,637,424 | 1/1987 | Morgan, III | 137/392 |
| 4,705,456 | 11/1987 | Gardeen | 417/63 |
| 5,190,442 | 3/1993 | Jorritsma | 417/7 |

*Primary Examiner*—Richard A. Bertsch
*Assistant Examiner*—Xuan M. Thai
*Attorney, Agent, or Firm*—Dressler, Goldsmith, Shore & Milnamow, Ltd.

[57] ABSTRACT

A multiple pump, multiple tank fluid control system incorporates a programmable processor which communicates with an operator input/output control panel which can be switched between each member of the plurality of tanks. Pump on and off levels for a selected tank can be readily set electronically using control switches on the control panel. On and off levels for different pumps can be nested readily by the operator to provide multiple pump capacity as deemed desirable by the operator.

19 Claims, 2 Drawing Sheets

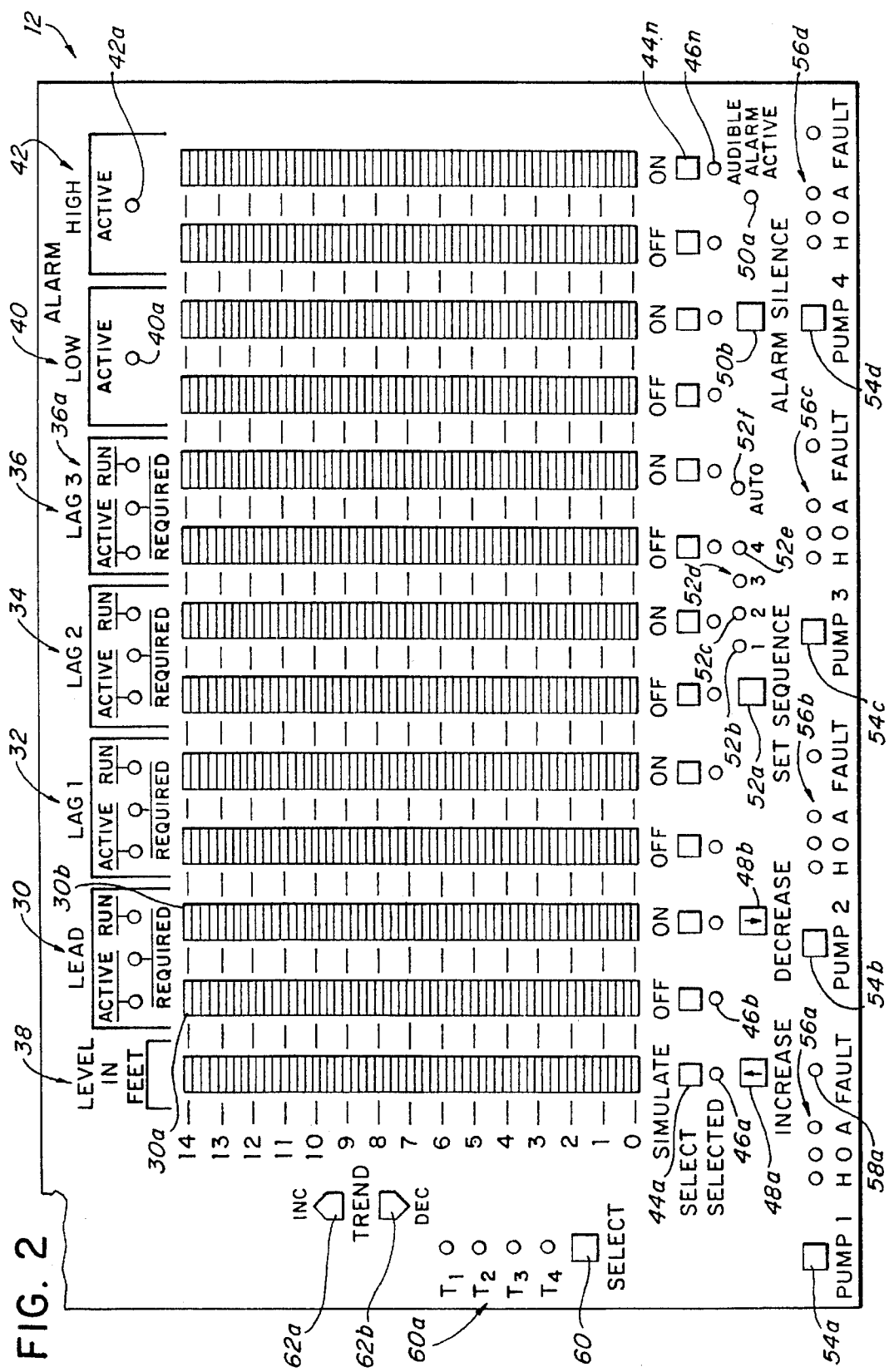

FLUID LEVEL CONTROL PANEL STRUCTURE FOR MULTI-PUMP SYSTEM

FIELD OF THE INVENTION

The invention pertains to level control systems. More particularly, the invention pertains to such control systems usable with multiple pumps to control the fluid level in a selected tank wherein operator modification of various pumping parameters is readily achieved.

BACKGROUND OF THE INVENTION

Various types of collecting or processing systems are in use which provide for the control and maintenance of fluid levels in a variety of tanks. Such systems include storm water collection systems, sewerage collection and water treatment systems.

Such systems often include collecting or separating tanks. Multiple pumps are associated with each of the tanks for back up and flood control purposes. In such systems the pumps are expected to be automatically turned on and off to sustain predetermined fluid levels in their respective tanks such that the fluid processing, be it a treatment of storm water or waste water can continue on an uninterrupted basis.

Known systems which can be used to control multiple pumps have limited operator interfaces which are inconvenient to use when an operator wishes to alter pump on and off levels. In some instances, electrically conducting plugs are inserted into sockets on a control panel to establish upper and lower fluid levels in a given tank.

In some of the known systems, a control panel is dedicated to each tank. If a separate control system and control panel are necessary for each tank, the cost of acquisition and installation, to say nothing of maintenance, can be substantial.

Thus, there continues to be a need for multiple pump fluid control systems which provide easy to use operator interfaces for the purpose of adjusting pump on and off levels. Further, it would be desirable to be able to reduce overall system cost by being able to multiplex the control of multiple sets of pumps, hence multiple fluid levels in respective tanks. Preferably a general purpose operator interface could be provided in combination with a process control element having sufficient processing capability to dynamically control a plurality of tanks simultaneously.

SUMMARY OF THE INVENTION

A level control system with a manually operable control and display panel can be used to simultaneously control the level of fluid in a plurality of tanks. A programmable control processor is coupled via interface circuitry and pump drivers to a plurality of pumps associated with each of the tanks.

Feedback from the tank provides an indicium of the level of fluid in the tank. Feedback from each of the pumps provides an indication as to whether the respective pump is pumping in response to applied electrical energy from the interface.

The operator control panel includes visual indicators indicating current fluid level in a selected tank as well as "off" and "on" preset levels for each of the pumps associated with that particular tank. An operator is easily able to select a particular pump as well as an existing "off" or "on" level and modify same.

Modification takes place by increasing and decreasing the "off" or "on" level using selected control switches on the panel. Feedback is provided to the operator essentially immediately by the control processor which alters the display indicating current, selected, "off" and "on" levels.

The control system makes it possible to overlap or to nest "off" and "on" levels for the pumps such that multiple pumps can be running simultaneously depending on the level of fluid in the selected tank.

The system can control a plurality of tanks. An operator can select a display associated with a particular tank via the control panel.

In the event that the pumps reduce the level in the tank excessively or are unable to reduce an overly high level, both visual and audible alarms are provided to alert the operating staff. Annoying audible alarms can be silenced.

The control system enables an operator to associate various of the pumps with a primary pumping function and others with a secondary pumping function. Alternately, an automatic allocation incorporated into the system can be used.

These and other aspects and attributes of the present invention will be discussed with reference to the following drawings and accompanying specification.

BRIEF DESCRIPTION OF THE DRAWING

FIG. 2 is a view of an input/output control panel in accordance with the present invention.

DETAILED DESCRIPTION OF THE PREFERRED EMBODIMENT

Figure 1:
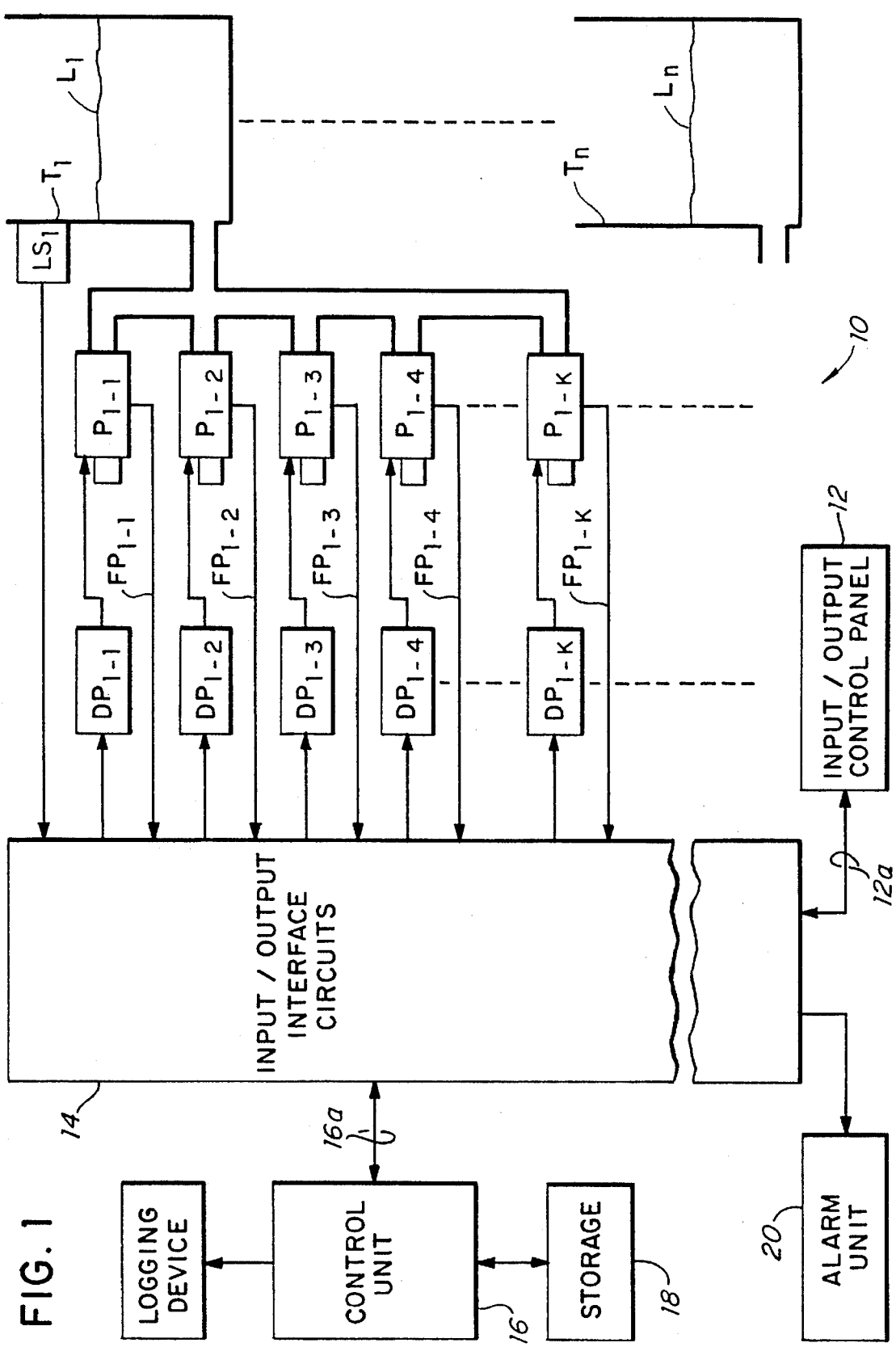
FIG. 1 is a block diagram of a multiple tank control system in accordance with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 is a block diagram of a system 10 in accordance with the present invention. The system 10 is usable with a plurality of tanks $T_1 \ldots T_n$.

Each of the tanks may contain a fluid with a level $L_1 \ldots L_n$. The system 10, in accordance with inputs entered via an input/output control panel 12, automatically controls the levels $L_1 \ldots L_n$ in respective tanks in accordance with previously set respective upper and lower levels therefor.

For the purpose of controlling the levels in the respective tanks, each tank such as tank $T_1$ has associate therewith a plurality of electrically driven pumps $P_{1-1} \ldots P_{1-k}$. The members $P_{1-1} \ldots P_{1-k}$ can be selectively operated, in accordance with inputs from the control panel 12 so as to cyclically start and stop in response to the current fluid level such as level $L_1$.

The input/output control panel 12 is coupled via a plurality of communications lines 12a and input/output interface circuitry 14, to a control processor 16. The control processor 16 is capable of bidirectional communication with the input/output interface circuitry 14 via a communications bus 16a.

The control processor 16 is coupled via bidirectional communication link (which could be the link 16a) to a storage element 18 which can include Random Access Memory as well as Read Only Memory. The control processor 16 can be implemented as a commercially available 8 or 16 bit programmable processor.

Each of the tanks, such as tank $T_1$ is equipped with a sensing transducer such as transducer $LS_1$. This transducer provides an electrical signal to input/output interface circuitry 14 which is indicative of the level $L_1$ in the tank $T_1$. The type of sensor used to detect a respective level, such as a level $L_1$, is not a limitation of the invention. Pressure, optical, ultrasonic/sonic or electro-mechanical sensors of fluid level can be used.

The input/output interface circuitry 14 is also coupled to a plurality of pump driver circuits $DP_{1\text{-}1} \ldots DP_{1\text{-}k}$. The pump driver circuits are in turn coupled to a respective one of the pumps $P_{1\text{-}1} \ldots P_{1\text{-}k}$. The processor 16, via the interface circuitry 14 can cause a pump driver, such as driver $DP_{1\text{-}1}$, to energize the respective pump, such as $P_{1\text{-}1}$ for the purpose of reducing the corresponding level $L_1$ in the respective tank.

A feedback signal, such as feedback signal $FP_{1\text{-}1} \ldots FP_{1\text{-}k}$ from each respective pump is coupled to the input/output interface circuitry 14. The signals on the lines $FP_{1\text{-}1} \ldots FP_{1\text{-}k}$ provide indicia to the control processor 16 indicating whether or not the respective pump is in fact running in response to electrical energy being applied thereto via a respective pump driver from the plurality of drivers $DP_{1\text{-}1} \ldots DP_{1\text{-}k}$.

It will be understood that while feedback sensor $LS_1$, pump drivers $DP_{1\text{-}1} \ldots DP_{1\text{-}k}$ and pumps $P_{1\text{-}1} \ldots P_{1\text{-}k}$ have been illustrated only with respect to tank $T_1$ that corresponding elements would be incorporated into the system 10 where additional tanks such as tank $T_2 \ldots T_n$ are to be controlled thereby. Neither the number and type of pumps nor the number of tanks are limitations of the present invention.

FIG. 2 is a view illustrating details of the input/output control panel 12. The control panel 12 includes columns 30 through 36 which in a preferred embodiment are associated with each of four pumps $P_{1\text{-}1} \ldots P_{1\text{-}k}$ in a particular implementation.

The column 30, also labelled "Lead" identifies a pump, selected via the control panel 12 which is the primary pump, based on present allocation, for maintaining the fluid level, such as the level $L_1$ of a respective tank $T_1$. Columns 32 through 36 are associated with up to three other pumps which provide supplemental pumping capacity in the event that the lead pump indicated by the column 30 is unable to maintain the level such as the level $L_1$ within preset limits. More pumps could be provided.

Each of the columns 30 through 36 is formed of a plurality of light emitting diodes (LEDs) which can be turned on and off under the control of the processor 16 in combination with inputs from the control panel 12. Depending on the application, one or more LEDs could be simultaneously illuminated in a given column. Each diode represents a quarter of a foot of fluid depth.

Column 38 labelled "Level in Feet" identifies the current tank level, such as the level $L_1$ as that level is being sensed by sensor $LS_1$. The column 38 is also formed of a plurality of light emitting diodes, wherein each diode represents a quarter of a foot. The light emitting diodes of the column 38 represent a level depth between 0 and 14 feet.

A current fluid level is indicated by the member or members of the plurality 38 which is currently being energized by the processor 16. As the level, such as the level $L_1$ in the respective tank such as the tank $T_1$, increases and decreases the light emitting diode or diodes in the column 38 changes in accordance therewith.

Control panel 12 includes alarm columns 40 and 42 each of which is also formed of a plurality of light emitting diodes. Each of the light emitting diodes in the columns 40, 42 represents a quarter of a foot of fluid level between 0 and 14 feet.

Spaced below the lower end of each of the columns 30 through 42 is a respective control switch 44a . . . 44n of a plurality 44. Associated with each control switch is a respective light emitting diode 46a . . . 46n of a plurality of indicators 46.

The control panel 12 also carries a control switch 48a labelled "increase" and a control switch 48b labelled "decrease". One of the advantages of the system 10 is the ease with which an operator can establish turn on/turn off levels for each of the respective pumps.

To establish either a turn on level or a turn off level for the lead pump, whichever pump that might be, an operator only has to select the "off" column 30a or the "on" column 30b by depressing a respective select switch such as the switch 44b or 44c. When the respective switch 44b or 44c is depressed, the control panel 12 via the input/output interface circuitry 14 signals the processor 16. The processor 16 in turn illuminates a respective "selected" light emitting diode, such as the diode 46b or the diode 46c.

For exemplary purposes, assuming that the "off column" 30a has been selected, the light emitting diode 46b will have been energized by the processor 16, and the fluid level at which the lead pump is to be turned off, is indicated by an illuminated light emitting diode or diodes in the column 30a. This level can now be altered by depressing the "increase" button 48a or the "decrease" button 48b.

In response to the control switches 48a and 48b being actuated by the operator, the processor 16 will increase or decrease the "off" level and alter the energized light emitting diode or diodes in the column 30a accordingly. Once an appropriate level has been established for the "off" condition, the switch 44b is depressed again which deselects column 30a causing the associated "selected" indicator 46b to be turned off by the processor 16. Similar actions can be taken with respect to each of the columns 32 through 36, 40 and 42.

The alarm columns 40, 42, indicate the "off" and "on" levels when an audible alarm unit 20 is to be energized in response to a fluid level such as a level $L_1$ falling below a predetermined acceptable "low" level or a predetermined "high" level. These are also set or altered as described above.

In the event that the audible alarm unit 20 is energized, the control panel 12 provides an indicium thereof via a light emitting diode 50a. Each alarm incident can be silenced via a control switch 50b. Each new incident shall renew alarm activation and may be individually silenced. A terminal block jumper will enable all audible alarms.

Switch 52a is pulsed by the operator to select one of 5 alternator conditions:

| Condition | |
|---|---|
| 1 | When Indicator 52b is Illuminated, Pump Sequence is Fixed As 1-2-3-4 |
| 2 | When Indicator 52c is Illuminated, Pump Sequence is Fixed As 2-3-4-1 |
| 3 | When Indicator 52d is Illuminated, Pump Sequence |

| Condition | |
|---|---|
| | is Fixed As 3-4-1-2 |
| 4 | When Indicator 52e is Illuminated, Pump Sequence is Fixed as 4-1-2-3 |
| 5 | When Indicator 52f is Illuminated, Pump Sequence is in Automatic Starting with 1-2-3-4 |

Indicator 52b is Illuminated to indicate the Starting Sequence, during operation when pumps are stopped, the sequence will index to 2-3-4-1 with Indicator 52c and Indicator 52f illuminated.

Associated with each of the pump control switches, such as a switch 54a is a plurality of indicators 56a. The members of the plurality 56a labelled H, O, and A all provide status information as to the operating condition of pump 1.

The "H" indicator signals that pump 1 is being run manually as a result of a depression of control switch 54a. The indicator "O" indicates that pump 1 has been turned off and is out of service as a result of a second depression of the control switch 54a. The indicator "A" indicates that pump 1 is being operated automatically under control of the processor 16 as a result of a third depression of the control switch 54a.

Each of the pluralities 56a, 56b, 56c and 56d, has associated therewith an indicator labelled "fault", such as the indicator 58a. The indicator 58a is energized by the processor 16 in response to the respective feedback signal on the line $FP_{1-1}$ indicating that the respective pump is not running notwithstanding the fact that the associated driver $DP_{1-1}$ is attempting to energize that pump.

Associated with each of the columns 30 through 36 is a respective plurality of indicators 30c through 36c. The members of the pluralities 30c through 36c are labelled "active", "run", and "required". These indicators are all energized by the processor 16.

The "active" indicator provides feedback to the operator that the respective pump has not been removed from service. The "run" indicator provides visual feedback to the operator that the respective pump is currently being energized and pumping fluid.

It will be understood that the "off" and "on" column settings for each of the columns 30 through 36 could be the same or identical as other columns in the plurality 30 through 36. Alternately, these settings could be nested within the settings of others of the plurality of columns 30 through 36. It is a particular advantage of the system 10 that the operator, via the control panel 12 is completely free to allocate the "off" and "on" levels for any of the pumps in an arbitrary, overlapping or nested fashion.

Associated with the columns 40 and 42 are indicators 40a and 42a indicating that either the low level alarm or the high level alarm is active.

The control panel 12 also carries a tank select control switch 60 and an associated plurality of indicators 60a. The conditions and display associated with up to four tanks $T_1$ ... $T_4$ can be selectively displayed on the panel 12 by depressing the control switch 60.

In response to the switch 60, the processor 16 in turn illuminates the appropriate light emitting diode of the plurality 60a and provides a display on columns 30 through 42 associated with the selected tank. Additionally, the control switches on the panel 12 are effective for altering conditions associated with the selected tank as described previously.

Alarms from all tanks shall be continuously active independently of the selected tank $T_1$ ... $T_4$. Any alarm or fault for a non-selected tank shall cause the audible alarm to activate and shall flash the respective tank indicating indicator from the plurality 60a for the tank/pump(s) initiating the fault(s).

Indicators 62a and 62b provide a visual output as to whether or not the level in the selected tank, as determined by the energized member of the plurality of indicator 60a, has an increasing trend of a decreasing trend.

It will also be understood that while not as explicitly indicated on the panel 12, additional control switches and visual indicators could be provided for printers or other output equipment under the simultaneous control of the processor 16. These additional output devices could provide a log of ongoing level control activities undertaken by the system 10 over a period of time. The log can be provided in either hard copy or on magnetic media.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A level control system usable with at least one tank containing a fluid wherein two or more pumps are coupled to the tank, the system comprising:

a control unit;

a fluid sensor coupled to said control unit wherein said sensor is adapted to provide an electrical signal to said control unit indicative of a depth of fluid in the tank;

pump interface circuitry, coupled to said control unit and couplable to the two or more pumps, for altering the depth of fluid in the tank;

an operator interface and display unit coupled to said control unit wherein said interface and display unit includes an elongated threshold indicating illuminatable display wherein said display includes a plurality of lightable threshold indicating elements, and an integral, manually operable, control element for establishing at least one threshold for energizing at least one of the pumps wherein said established threshold is represented on said display by illuminating at least one of said lightable elements.

2. A system as in claim 1 wherein said interface and display unit includes a manually operable switch for selecting one of the two or more pumps and wherein said control element includes at least first and second switches, fixably attached to said display unit wherein said first and second switches are usable with any selected pump, for increasing or decreasing first and second illuminated thresholds associated with each respective pump.

3. A system as in claim 1 wherein said display unit includes at least first and second illuminatable columns associatable with a selected one of the pumps wherein an extent of illumination of one of said columns indicates a pump energizing threshold and an extent of illumination of the other indicates a pump de-energizing threshold.

4. A system as in claim 1 wherein said display unit includes first and second illuminatable pump on-off level indicating columns associated with each of the pumps and at least one selector switch for selecting a column wherein said control unit includes circuitry for increasing an illuminated portion of a selected column in response to said control element.

5. A level control system as in claim 1 wherein said control unit includes a programmable processor.

6. A level control system as in claim 1 wherein said control unit includes a plurality of information storage locations wherein a plurality of first and second level indicating indicia are stored and wherein pairs of said indicia indicate first and second level parameters associated with respective of the pumps.

7. A level control system as in claim 1 which includes a logging device coupled to said control unit.

8. A level control system as in claim 1 which includes a switch for specifying a pump actuation sequence.

9. An operator panel for a fluid level control system comprising:

a panel;

at least first and second, spaced apart columns carried on said panel wherein each of said columns is formed of a plurality of light emitting elements, wherein at least one element in each of said columns is illuminated to indicate a preset threshold value;

a control element coupled to said columns; and a threshold altering switch carded on said panel, displaced from said columns, and coupled to said control element for altering which of said elements is illuminated thereby indicating a different threshold value.

10. A panel as in claim 9 wherein at least two elements in each column can be simultaneously illuminated in response to said threshold altering switch and wherein an increasing threshold in one of said columns is indicated by illuminating simultaneously a corresponding increasing number of said elements of said column.

11. A panel as in claim 9 wherein said control element, in response to said threshold altering switch increases a number of simultaneously illuminated elements in a selected column to thereby indicate an increasing threshold value.

12. A panel as in claim 11 which includes a second threshold altering switch coupled to said control element and wherein said control element in response to said second switch, decreases the number of simultaneously illuminated elements in said selected column to thereby indicate a decreasing threshold value.

13. A display device for displaying fluid level set points comprising:

a support member;

at least one plurality of linearly arranged, individually illuminatable, display elements carried on said support member, wherein a preset fluid level set point is indicated by illuminating at least one of said plurality of display elements;

a control unit coupled to said plurality of display elements;

pump interface circuitry coupled to said control unit;

at least one manually actuatable control switch coupled to said control unit wherein said control unit, in response to said actuation of said switch, illuminates at least one element not illuminated prior to actuation of said switch thereby indicating a different fluid level set point.

14. A display as in claim 13 which includes a second plurality of linearly arranged display elements carried on said support number wherein a second preset fluid level set point is indicated by illuminating at least one element of said second plurality, and wherein said pluralities extend parallel to and are spaced apart from one another.

15. A display device as in claim 13 wherein said control unit includes circuitry for storing at least a representation of said preset fluid level set point.

16. A display device as in claim 14 wherein said control unit includes circuitry for simultaneously illuminating a first group of said display elements from said first plurality, indicating a first set point and a second group of said display elements from said second plurality thereby indicating a second set point.

17. A level control system usable with at least one tank containing a fluid wherein two or more pumps are coupled to the tank, the system comprising:

a control unit wherein said unit includes parameter storage circuitry;

a fluid sensor coupled to said control unit wherein said sensor is adapted to provide an electrical signal to said control unit indicative of a depth of fluid in the tank;

pump interface circuitry, coupled to said control unit and couplable to the two or more pumps, for altering the depth of fluid; and an operator interface and display unit coupled to said control unit wherein said interface and display unit include a threshold indicating, elongated display with individually illuminatable segments and an integral, manually operable, control element for establishing at least one threshold for energizing at least one of the pumps wherein said one threshold is indicated by illuminating at least one of said segments.

18. A system as in claim 17 wherein said interface and display unit include a manually operable switch for selecting one of the two or more pumps and wherein said control element includes at least first and second switches, usable with any selected pump, for increasing or decreasing first and second turn-on, turn off thresholds associated with said selected pump.

19. A system as in claim 17 wherein said display unit includes at least first and second illuminatable multi-segment columns associatable with a selected one of the pumps, wherein illumination of a segment of one of said columns indicates a pump energizing threshold and illumination of a segment of the other indicates a pump de-energizing threshold.

* * * * *